United States Patent
Wang

(10) Patent No.: US 7,555,136 B2
(45) Date of Patent: Jun. 30, 2009

(54) NASAL BONE CONDUCTION WIRELESS COMMUNICATION TRANSMITTING DEVICE

(75) Inventor: Dave Wang, Taipei County (TW)

(73) Assignee: Victorion Technology Co., Ltd. (TW)

( * ) Notice: Subject to any disclaimer, the term of this patent is extended or adjusted under 35 U.S.C. 154(b) by 760 days.

(21) Appl. No.: 11/150,159

(22) Filed: Jun. 13, 2005

(65) Prior Publication Data

US 2005/0286734 A1    Dec. 29, 2005

(30) Foreign Application Priority Data

| Jun. 25, 2004 | (TW) | ............................ 93118650 A |
| Jul. 5, 2004 | (TW) | ............................ 93120134 A |
| Nov. 30, 2004 | (TW) | ............................ 93136926 A |
| Nov. 30, 2004 | (TW) | ............................ 93136930 A |

(51) Int. Cl.
    *H04R 25/00* (2006.01)
(52) U.S. Cl. ..................... 381/380; 381/151; 381/327; 381/381
(58) Field of Classification Search ................ 381/151, 381/381; 455/39–48
    See application file for complete search history.

(56) References Cited

U.S. PATENT DOCUMENTS

| 4,520,238 | A | * | 5/1985 | Ikeda .......................... 381/151 |
| 5,447,489 | A | * | 9/1995 | Issalene et al. ................. 600/25 |
| 5,687,244 | A | | 11/1997 | Untersander |
| 6,987,947 | B2 | * | 1/2006 | Richenstein et al. ........ 455/3.06 |
| 7,310,427 | B2 | * | 12/2007 | Retchin et al. ............... 381/380 |
| 2003/0048915 | A1 | * | 3/2003 | Bank .......................... 381/326 |
| 2003/0095677 | A1 | | 5/2003 | Takeda |
| 2005/0141730 | A1 | | 6/2005 | Murphy |

FOREIGN PATENT DOCUMENTS

| JP | 59191996 | 10/1984 |
| JP | 62200997 | 9/1987 |
| JP | 2002315083 | 10/2002 |
| JP | 2002330497 | 11/2002 |
| JP | 2003348208 | 12/2003 |
| TW | 00463517 B | 11/2001 |
| WO | WO 0187007 | 11/2001 |
| WO | WO 0207841 | 1/2002 |
| WO | WO 0243436 | 5/2002 |
| WO | WO 2004047321 | 6/2004 |
| WO | WO 2004/093493 | 10/2004 |
| WO | WO 2005053800 | 6/2005 |
| WO | WO 2005109950 | 11/2005 |

* cited by examiner

*Primary Examiner*—Brian Ensey
*Assistant Examiner*—Matthew Eason
(74) *Attorney, Agent, or Firm*—Bacon & Thomas, PLLC

(57) ABSTRACT

The nasal bone conduction wireless communication transmitting device of the present invention comprises a bone conduction inputting device; a wireless communication transmitting device electrically connected to the bone conduction inputting device; a bone conduction outputting device having a second oscillator; and a carrier device for supporting those abovementioned devices. The invention is characterized by that the carrier device is a carrier provided on the nose for making the bone conduction outputting device and the bone conduction inputting device supported by it closely touching the skin of the nasal bone, and making the oscillating wave of the bone conduction outputting device being sent to the ear via the nasal bone conduction after the resonance in the nasal cavity; and converting the sound provided through the nasal conduction resonance by the bone conduction inputting device into an electrical wave, and then transmitting it to the wireless communication transmitting device for signaling.

35 Claims, 9 Drawing Sheets

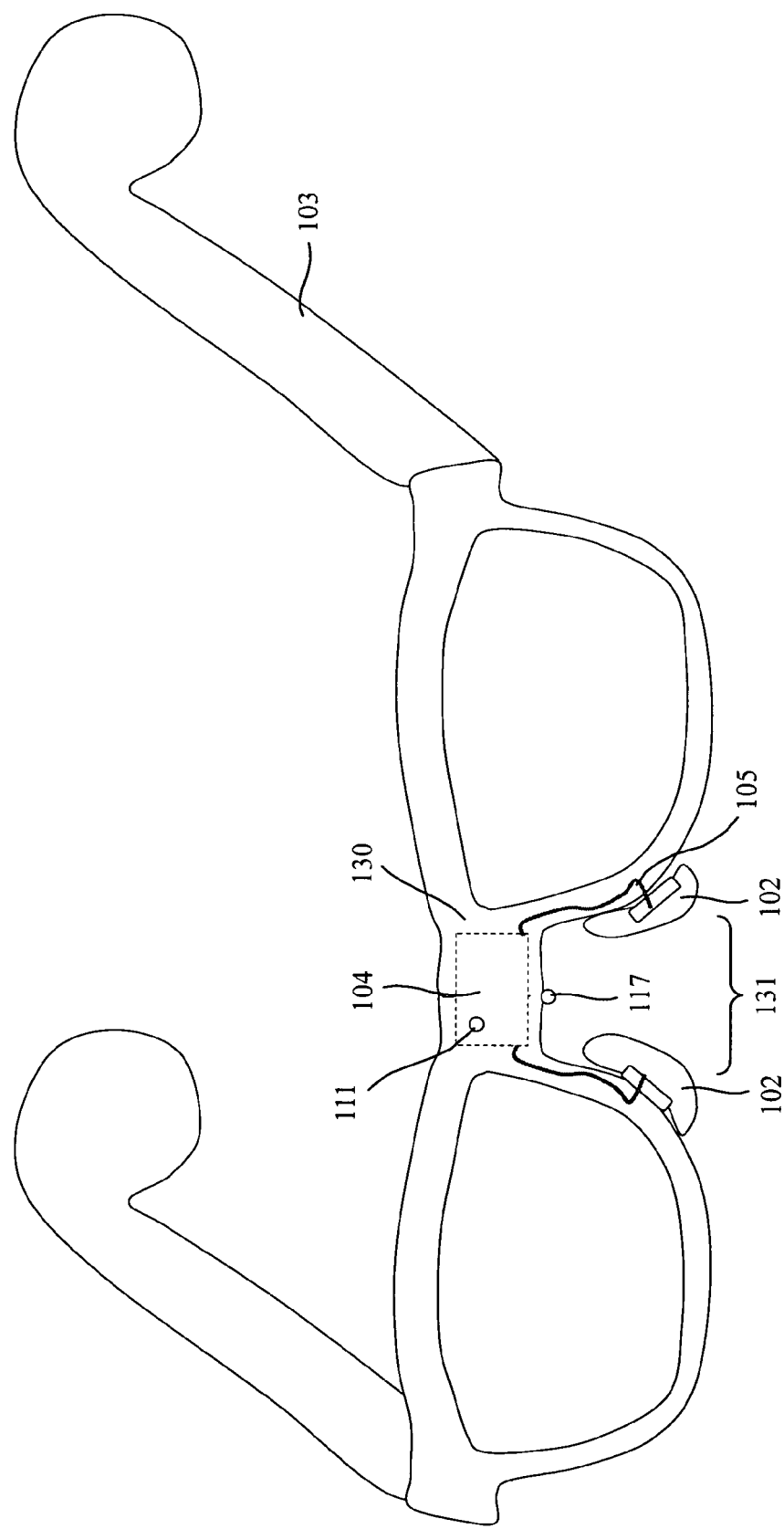

NASAL BONE CONDUCTION WIRELESS COMMUNICATION TRANSMITTING DEVICE

FIELD OF THE INVENTION

The present invention relates to a nasal bone conduction wireless communication transmitting device, and more particularly to a nasal bone conduction wireless communication transmitting device by using oscillation and in connection with the transmitting and receiving of a wireless communication device.

BACKGROUND OF THE INVENTION

Sound is propagated via air, but common wireless earphones or hearing aids, which propagate the sound into the ear via air, often cannot eliminate external background audio source. Thus, an oscillator using bone conduction or skin conduction is accordingly developed.

TW patent no. 463517 discloses a transceiving device using a skeleton conduction based loud speaker, which device is provided with a skeleton conduction based loud speaker part, a microphone part, and a receiving part for a driving circuit, and which device can be connected to a telephone or a wireless transceiver. The abovementioned skeleton conduction based loud speaker part is formed such that it can be attached on any position of the face when the abovementioned microphone part is put aside the mouth. However, the configuration of being attached on any position of the face does not necessarily have the skeleton conduction effect.

Another conventional general touching type of indirect sound wave bone conduction device put on the neck can eliminate some background sound, but the sound quality transmitted therefrom is not clear because of touching the throat. Because it is clipped on the neck, it is likely to slide, meanwhile it is inconvenient and not aesthetically pleasing. And the audio signal of the conventional general touching type of indirect bone conduction device put on the neck will be decayed and less clear than that of a local call.

Another conventional eyeglasses type of bone conduction hearing aid will put an oscillator at the ear tail of a frame for glasses. It can eliminate the background sound, but it is used only for hearing and unable to generate sound. Further, the brace for glasses will loose and unable to attach closely to the ear bone because of usage for a long time, thereby making the effect of hearing aid significantly reduced. In recent years, mobile devices such as mobile phones are popular, and wireless Bluetooth communication devices are very prevalent, such that the problems of hearing and speaking when these mobile devices are in use can be dissolved. Its disadvantages are in that the external background sound can not be removed, it is very uncomfortable for putting on the ear for a long time, the heavy brace for glasses is not aesthetically pleasing, the portion after the ear will sweat and lose the function of the hearing aid, as well as it will fall off easily while taking exercise. Meanwhile, if such eyeglasses type of bone conduction hearing aid uses left and right braces for glasses, then some elements, such as batteries, microphones, etc., can not be shared, it makes the user have to pay approximately twice cost and does not meet economic effect.

SUMMARY OF THE INVENTION

It is an object of the present invention to provide a nasal bone conduction wireless communication transmitting device by using an oscillator via the nasal bone conduction and in connection with the transmitting and receiving of a wireless communication transmitting device.

It is also an object of the present invention to provide a nasal bone conduction wireless communication transmitting device by the connection of a carrier device with the transmitting and the receiving sides of a wireless communication transmitting device.

It is another object of the present invention to provide a nasal bone conduction wireless communication transmitting device having the function of a hearing aid by a talker in connection with a wireless communication transmitting device.

It is still an object of the present invention to provide a nasal bone conduction wireless communication transmitting device having the function of an intercom, a wireless two way radio by a transmitting device in connection with a wireless communication transmitting device.

It is yet still an object of the present invention to provide a nasal bone conduction wireless communication transmitting device having the function of a speaker phone by an oscillator in connection with a wireless communication transmitting device.

It is yet still an object of the present invention to provide a multifunctional nasal bone conduction wireless communication transmitting device having the function of a hearing aid, an intercom, a wireless two way radio, an earphone, and a speaker phone.

The present invention provides a nasal bone conduction wireless communication transmitting device, comprising:

a bone conduction inputting device having a first oscillator, it will convert the sound to be output into an electrical wave;

a wireless communication transmitting device electrically connected to the bone conduction inputting device, it will receive the electrical wave signal and transmit it out and/or receive an external electrical wave signal;

a bone conduction outputting device having a second oscillator, it will receive the external electrical wave signal sent by the wireless communication and convert the electrical wave signal into an oscillating wave, and make the oscillating wave transmitted into the ear via nasal conduction; and a carrier device for supporting the abovementioned devices;

characterized by, the carrier device is a carrier provided on the nose for making the bone conduction outputting device and the bone conduction inputting device supported by it closely touching the skin of the nasal bone, and making the oscillating wave of the bone conduction outputting device being sent to the ear via the nasal bone conduction after the resonance in the nasal cavity; and converting the sound provided through the resonance in the nasal cavity by the bone conduction inputting device into an electrical wave, and then transmitting it to the wireless communication transmitting device for signaling.

The abovementioned bone conduction inputting device is a user talking device.

The abovementioned bone conduction outputting device is a user receiving device.

The abovementioned carrier device is glasses, hydroscopes, goggles, eyeprotection glasses, nose masks, mouth masks, face masks, head masks, helmet, skidlid, patches, nose clips, or other carrier devices that can make the nasal bone conduction wireless communication transmitting device attached on the skin of the nose.

The abovementioned wireless communication transmitting device has a signal transceiving unit, a signal processing unit, a talker, a function selector, an audio source switch, and a volume tuner.

The abovementioned wireless communication transmitting device further provides a talker, the talker is used for collecting the sound and transmitting the collected sound signal to the bone conduction outputting device, thereby making the inventive device have the function of a hearing aid.

The signal transceiving unit of the abovementioned wireless communication transmitting device is used for processing the transceiving of a wireless electrical signal, and the signal transceiving unit has an antenna, a frequency matching module, a radio frequency signal receiving module, a radio frequency signal transmitting module, a radio frequency signal amplifier, and an electronic filter.

The signal processing unit of the abovementioned wireless communication transmitting device is used for processing a signal, and the signal processing unit has a signal processor, a default parameter value storage, a parameter modification register, a function module, and a feedback elimination processing module.

The abovementioned default parameter storage is used for storing various default parameters of the wireless communication transmitting device.

The abovementioned feedback elimination processing module is used for reducing the feedback sound of the wireless communication transmitting device.

The abovementioned function selector is used for switching various function modules.

The abovementioned volume tuner is used for tuning the sound volume.

The abovementioned wireless communication transmitting device comprises an audio source switch, which is used for switching the audio source of the talker or the bone conduction inputting device.

In addition, the present invention provides a nasal bone conduction wireless communication system, comprising:
   a transmitting device; and
   a nasal bone conduction wireless communication transmitting device which wirelessly connects the transmitting device, comprising:
     a bone conduction inputting device having a first oscillator, it will convert the sound to be output into an electrical wave;
     a wireless communication transmitting device electrically connected to the bone conduction inputting device, it will receive the electrical wave signal and transmit it out and/or receive an external electrical wave signal;
     a bone conduction outputting device having a second oscillator, it will receive the external electrical wave signal sent by the wireless communication and convert the electrical wave signal into an oscillating wave, and make the oscillating wave transmitted into the ear via nasal conduction; and
     a carrier device for supporting the abovementioned devices;
   characterized by,
   the carrier device is a carrier provided on the nose for making the bone conduction outputting device and the bone conduction inputting device supported by it closely touching the skin of the nasal bone, and making the oscillating wave of the bone conduction outputting device being sent to the ear via the nasal bone conduction after the resonance in the nasal cavity; and converting the sound provided through the resonance in the nasal cavity by the bone conduction inputting device into an electrical wave, and then transmitting it to the wireless communication transmitting device for signaling.

The abovementioned wireless communication transmitting device will establish a wireless connection with a transmitting device, and the transmitting device is a wireless communication transmitting product having the function of linking, transmitting, and frequency matching.

The wireless connection between the abovementioned wireless communication transmitting device and the transmitting device is established according to Bluetooth wireless communication protocol.

The abovementioned transmitting device is formed by a wireless communicator interfacing with a signal transceiver, and the wireless communicator will establish a wireless connection with the wireless communication transmitting device via a signal transceiver.

The abovementioned wireless communication transmitting device will receive or transmit a wireless signal based on Bluetooth wireless communication protocol or microwave or infrared ray or RF or RFID sensors.

The abovementioned wireless communicator is a mobile phone, a PDA, or similar wireless communication transmitting products.

The abovementioned signal transceiver has a signal processor, a radio frequency signal receiving module, a radio frequency signal transmitting module, and a frequency matching module. And it further comprises a wireless adjuster.

It is convenient for a user to use the abovementioned wireless adjuster to wirelessly adjust the functions of parameter modification, function module, and volume size, etc. provided in the wireless communication transmitting device.

The abovementioned wireless adjuster may be provided in the transmitting device, it may also be set up independently to wirelessly operate the functions of parameter modification, function module, and volume size, etc.

The abovementioned wireless communicator and the signal transceiver are electrically connected via a connector, the connector will electrically connect the wireless communicator and the signal transceiver, and the connector may be designed in the form of an earphone jack, a PCMCIA card, or an USB port.

The abovementioned wireless communication transmitting device could work with the audio function, such as a MP3 player, a walkman, a computer, a recorder, a hi-fi equipment or a television, of the transmitting device to make a wireless connection, thereby making the device of the present invention have the function of an earphone being able to wirelessly transmitting and receiving.

The frequency matching module of the signal transceiver of the abovementioned transmitting device may tune the frequency with respect to the frequency matching module of the signal transceiving unit of the wireless communication transmitting device, thereby making the device of the present invention have the function of a wireless two way radio.

To improve the efficiency of the sound conduction via the bone and the convenience of device-wearing, the present invention further provides a nasal bone conduction hearing aid device which may be embedded into a carrier(e.g. glasses) located on the nose, or a nasal bone conduction hearing aid device which may be sticked/attached to a carrier(e.g. glasses) located on the nose or a nasal bone conduction hearing aid device which may be directly sticked/attached to the nose.

The object of the present invention is to provide a nasal bone conduction hearing aid device which can send the external sound into the ear via a nasal bone oscillator.

The nasal bone conduction hearing aid of the present invention comprises:

an adjusting device, it will receive and process the sound signal sent from the external environment;

a bone skin conduction oscillating device having an oscillator, it will receive the signal processed by the adjusting device; and a carrier device for supporting the adjusting device and the bone skin conduction oscillating device;

characterized by, the carrier device is a carrier provided on the nose for making the bone skin conduction oscillating device closely touching the skin of the nasal bone, and the oscillator is used for converting the electrical wave received by the bone skin conduction oscillating device into an oscillating wave and transmitting it to the nose, thereby making the oscillating wave being sent to the ear via the nasal bone skin conduction.

The abovementioned carrier device is glasses, hydroscopes, goggles, eyeprotection glasses, nose masks, patches, protection masks, or any other carriers that can be attached to the skin of the nose.

The abovementioned adjusting device comprises a power supplying device, an alarm, a talker, an electrical wave amplifier, a frequency control processing module, a signal processing module, and a feedback elimination processing module.

The abovementioned talker is used for collecting the external sound.

The abovementioned electrical wave amplifier is used for enhancing the signal strength of the talker.

The abovementioned frequency control processing module is used for selecting the frequency of the signal of the talker and the amplifier.

The abovementioned signal processor is used for processing the signal after selecting frequency, and outputting a sound that more meet the hearing requirement of the user.

The abovementioned feedback elimination processing module is used for reducing or eliminating the feedback sound of the hearing aid.

The abovementioned adjusting device further comprises a power supplying device and a volume tuner.

The abovementioned volume tuner is used for tuning the volume size.

The abovementioned power supplying device is used for supplying the power to the operation of various apparatuses.

The abovementioned power supplying device is a battery or a related product that can supply power.

BRIEF DESCRIPTION OF ILLUSTRATIONS

FIG. 9 is a 3D diagram of a nasal bone conduction hearing aid embedded into a carrier, such as glasses, according to the present invention.

DETAILED DESCRIPTION OF THE INVENTION

Figure 1:
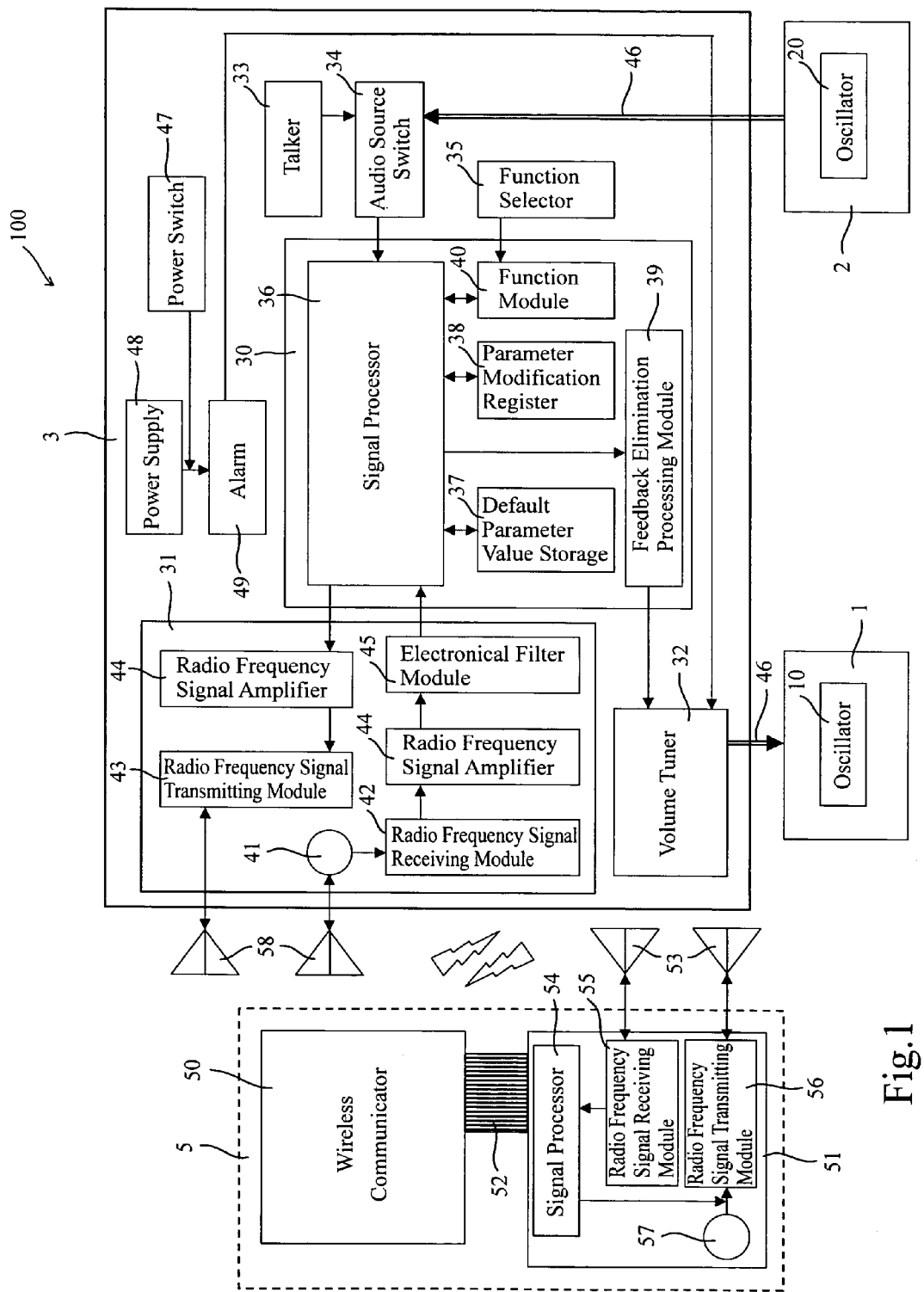
FIG. 1 is a block diagram of a nasal bone conduction wireless communication transmitting system according to the present invention.

Referring to FIG. 1, a block diagram of a nasal bone conduction wireless communication transmitting system according to the present invention is shown. The nasal bone conduction wireless communication transmitting device 100 according to the present invention comprises: a bone conduction outputting device 1 having an oscillator 10; a bone conduction inputting device 2 having an oscillator 20; a wireless communication transmitting device 3, which wireless communication transmitting device 3 comprises a signal processing unit 30, a signal transceiving unit 31, a volume tuner 32, a talker 33, an audio source switch 34, a function selector 35, and an antenna 53; and a carrier device(see FIG. 5 and FIG. 6) which is for supporting the abovementioned devices and is provided on the nose, wherein the wireless communication transmitting device 3 will establish a wireless connection with a transmitting device 5. The transmitting device 5 is a wireless communication product having the function of linking, transmitting, and frequency matching, and the transmitting device 5 is formed by a wireless communicator 50 interfacing with a signal transceiver 51. The wireless communicator 50 and the signal transceiver 51 are electrically connected via a connector 52.

In an embodiment, the wireless communication transmitting device 3 is further provided with a power switch 47, a power supply 48, and an alarm 49. The power switch 47 is used for enabling or disabling the nasal bone conduction wireless communication transmitting device according to the present invention. The power supply 48 is used for supplying the electrical power need by this device, and the power supply 48 is a general battery, a fuel battery, or any device that can supply power. The alarm 49 will automatically issue an alarm signal to prompt the user to change the battery when the power reaches a low supply level. The wireless communicator 50 is a mobile phone, a PDA having the ability of communication, or similar wireless communication transmitting products. And the connector 52 may be designed in the form of an earphone jack, a PCMCIA card, or an USB port.

Continuing referring to FIG. 1, the bone conduction outputting device 1 is put on the nose of the user, and the bone conduction outputting device 1 will closely touch the skin of the nose. The oscillator 10 of the bone conduction outputting device 1 is provided to convert the electrical wave come from the wireless communication transmitting device 3 into an oscillating wave, and make the oscillating wave resonate in the nasal cavity, and then send the oscillating wave into the ear via the bone conduction to provide the function of receiving and hearing. The bone conduction inputting device 2 is also put on the nose of the user, and the bone conduction inputting device 2 will closely touch the skin of the nose. The oscillator 20 of the bone conduction inputting device 2 is provided to convert the electrical wave converted from the oscillating wave generated by the sound produced via the resonance in the nasal cavity to provide the function of talking. The transmitting device 5 will send an electronic message to the bone conduction outputting device 1 and/or receive an electronic message from the bone conduction inputting device 2 via the wireless communication transmitting device 3. The wireless communicator 50 of the transmitting device 5 will link the signal transceiver 51 via the connector 52. And the wireless communication transmitting device 3 will electrically connect the bone conduction inputting device 2 and the bone conduction outputting device 1 for transceiving a wireless signal.

The nasal bone conduction wireless communication transmitting device 100 according to the present invention has the function mode of a wireless communication transmitting speaker phone, a wireless intercom, a hearing aid, and an earphone. The signal transceiver 51 of the transmitting device 5 has a signal processor 54, a radio frequency signal receiving module 55, a radio frequency signal transmitting module 56, an antenna 53, and a frequency matching module 57. In a further embodiment of the present invention. The signal transceiver 51 of the transmitting device 5 also has a wireless adjuster, and the wireless adjuster is provided to adjust or modify the values of the parameter of the parameter modification register 38, the function of the function module 40, as well as the volume size of the volume tuner 32. And the signal transceiver 51 will establish a wireless connection with the wireless communication transmitting device 3 based on Bluetooth wireless communication protocol or microwave or infrared ray or RF or RFID sensors. The signal processing unit 30 of the wireless communication transmitting device 3 is used for processing the signal, and the signal processing unit 30 has a power supply 48, a power switch 47, an alarm 49, a signal processor 36, a default parameter value storage 37, a parameter modification register 38, a feedback elimination processing module 39, and a function module 40. Wherein the signal processor 36 may store many sets of frequency under various function modes, and process the received and transmitted electronic signal. And the default parameter value storage 37 is used for storing various parameters of the wireless communication transmitting device 3 and writing into an IC chip. The parameter modification register 38 may directly adjust or modify via a wireless adjuster some functions and parameter values under the use environment according to the user, and automatically store the last modified parameter value. The feedback elimination processing module 39 will automatically generate a set of reverse electronic signals to cancel out the feedback noise generated in the signal of the signal processor 36 to achieve the purpose of feedback elimination and reduce the interference, thereby reducing the feedback sound of the wireless communication transmitting device 3 and maintaining the stability of the sound quality. The function module 40 is used for setting the mode of a wireless speaker phone, a wireless two way radio, a hearing aid, or an earphone, so that the present invention may provide the function selection for diverse functions. Furthermore, in different embodiments, the wireless adjuster may be a stand alone unit which may operate the function of parameter modification, function module, and volume size, etc. using a wireless operation such as radio frequency(RF), rather than provided in the transmitting device or the signal transceiver 51.

The signal transceiving unit 31 of the wireless communication transmitting device 3 has an antenna 58, a frequency matching module 41, a radio frequency signal receiving module 42, a radio frequency signal transmitting module 43, a radio frequency signal amplifier 44, and an electronic filter module 45. The frequency matching module 41 is used for matching the frequencies between wireless electrical signals in order to communicate the wireless message each other. The radio frequency signal receiving module 42 is a receiver for wireless electrical signals. The radio frequency signal transmitting module 43 is a transmitter for wireless electrical signals. The radio frequency signal amplifier 44 is used for amplifying the wireless electrical signals and then sending these signals out, thus preventing the signal from decaying. The electronic filter module 45 is used for filtering the noise out of the sound signal via a filter to enhance the stability of the electrical wave signal. The function selector 35 of the wireless communication transmitting device 3 is used for switching among various function modules. The volume tuner 32 of the wireless communication transmitting device 3 is used for tuning the volume size, the user also can make the adjustment by the wireless adjuster for convenience. The talker 33 of the wireless communication transmitting device 3 is used for collecting the sound and transmitting the collected signal to the bone skin conduction outputting device 1, thereby making the nasal bone conduction wireless communication transmitting device 100 have the function of a hearing aid.

Continuing referring to FIG. 1 again, when the nasal bone conduction wireless communication transmitting device 100 of the present invention is in the wireless communication transmitting speaker phone function mode, the followings will be sequentially performed to enter the function mode of the wireless communication transmitting speaker phone. Link the wireless communicator 50 and the signal transceiver 51 of the transmitting device 5 to send a sound signal to the wireless communication transmitting device 3. The signal will be received by the wireless communication transmitting device 3 via the antenna 53 and the radio frequency signal receiving module 42 and amplified by the radio frequency signal amplifier 44, and then the noise will be filtered out of the signal via the electronic filter module 45 to enhance the stability of the electrical wave signal. And then the signal processor 36 of the signal processing unit 30 will determine the transmitted signal is a communication signal for the wireless communication transmission so as to perform the action of the speaker phone. The signal will then be sent to the volume tuner 32 through the feedback elimination processing module 39 to make a proper volume size. The signal will then be sent to the bone conduction outputting device 1 through a transmitting line 46 and be converted into an oscillating wave by the oscillator 10 of the bone conduction outputting device 1 and be delivered through the ear by the nasal bone of the nose to achieve the function of receiving and hearing. Furthermore, the oscillating wave of the user when the user is talking will be converted into an electrical wave by the oscillator 20 of the bone conduction inputting device 2 and will be sent to the audio source switch 34 of the wireless communication transmitting device 3 through a transmitting line 46. The signal will be processed by the signal processor 36 of the signal processing unit 30 and amplified by the radio frequency signal amplifier 44 of the signal transceiving unit 31. And then the wireless signal will be received by the radio frequency signal transmitting module 43 via the antenna 58 and antenna 53 and then be sent to the signal transceiver 51 of the transmitting device 5 and be sent to the wireless communicator 50 via the connector 52 to achieve the function of talking.

When the nasal bone conduction wireless communication transmitting device 100 of the present invention is in a wireless two way radio function mode, a signal will be sent from the function selector 35 of the wireless communication transmitting device 3 to the function module 40 of the signal processing unit 30 to switch to the use mode of the wireless intercom. After tuning the frequency of the frequency matching module 41 of the wireless communication transmitting device 3 to match the frequency of the frequency matching module 57 of the transmitting device 5, the operation of setting the mode of the wireless two way radio is then completed, and the abovementioned wireless communicator 50 will enter the wireless two way radio function mode. Other architectures are similar and the description thereof is not duplicated.

When the nasal bone conduction wireless communication transmitting device 100 of the present invention is in the hearing aid function mode, a signal will be sent from the function selector 35 of the wireless communication transmitting device 3 to the function module 40 of the signal processing unit 30 to switch to the use mode of the hearing aid. The talker 33 of the wireless communication transmitting device 3 will switch to the function of talking via the setting of the audio source switch 34 to temporarily block the sound signal of the transmitting device 5 from entering, and only use the talker 33 to collect the sound. When a wireless communication electronic signal is sent to the transmitting device 5, the audio source switch will automatically cut off the sound source of the talker 33, and it will automatically become the function mode of the speaker phone at the same time. At the end of the communication electronic signal, it will automatically turn to the hearing aid mode. And the collected sound signal will be processed by the signal processing unit 30 and then be sent to the bone conduction outputting device 1 and be converted into an oscillating wave by the oscillator 10 of the bone conduction outputting device 1 and be delivered through the ear by the nasal bone of the nose to achieve the function of receiving and hearing, thereby completing the mode of the hearing aid having the function of receiving and hearing.

When the nasal bone conduction wireless communication transmitting device 100 of the present invention is in the earphone function mode, the followings will be sequentially performed to enable the inventive device to enter the function mode of the earphone. After connecting the transmitting device 5 to an audio product, such as a MP3 player, a walkman, a computer, a recorder, a hi-fi equipment or a television, to be used, an audio signal can be transmitted by the signal transceiver 51. And a signal will be sent from the function selector 35 of the wireless communication transmitting device 3 to the function module 40 of the signal processing unit 30 to switch to the use mode of the earphone. Thus the inventive device will become an earphone having the function of wireless receiving and hearing.

In a further embodiment of the present invention, the switch of the function module 40 is performed by the wireless adjuster.

In various embodiments of the present invention, the carrier device is glasses, hydroscopes, goggles, eyeprotection glasses, nose masks, mouth masks, face masks, head masks, helmet, skidlid, patches, nose clips, or other carrier devices that can make the nasal bone conduction wireless communication transmitting device attached on the skin of the nose. The wireless communicator 50 of the transmitting device 5 is a mobile phone, a PDA, a computer, a wireless intercom, or a wireless communication product such as a RF or microwave or infrared transmitter. The signal processor 54 can be integrated as an integrated circuit product. The signal transceiver 51 of the transmitting device 5 can also be embedded into the wireless communicator 50 without any linking to the wireless communicator 50 via the connector.

In another embodiment of the present invention, the nasal bone conduction wireless communication transmitting device 100 can combine with the signal transceiver 51 to form a nasal bone conduction wireless communication transmitting System.

Figure 2:
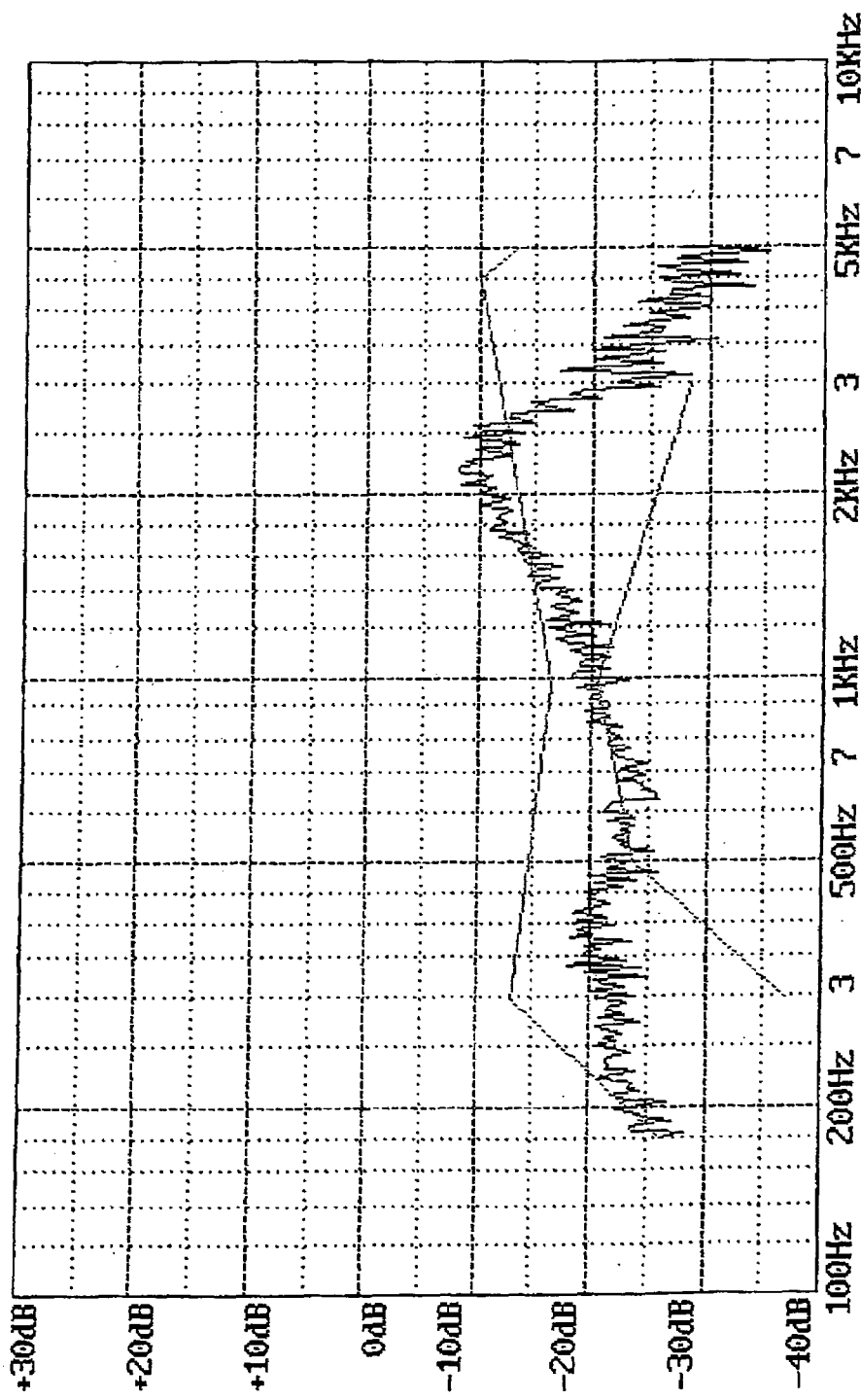
FIG. 2 is an experimental sound frequency signal diagram of a nasal bone conduction wireless communication transmitting system according to the present invention.
Figure 3:
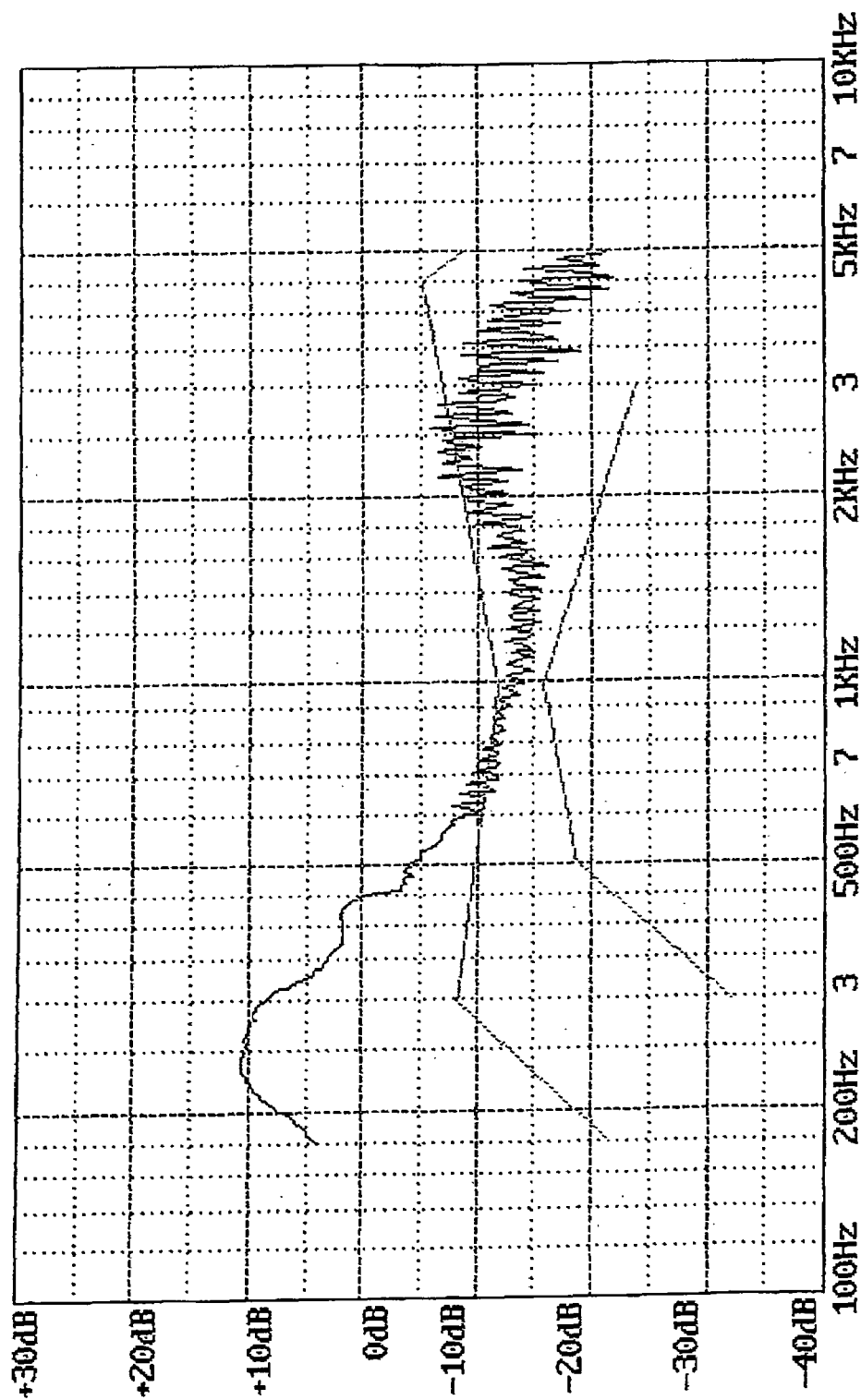
FIG. 3 is a sound frequency signal diagram for a local call.
Figure 4:
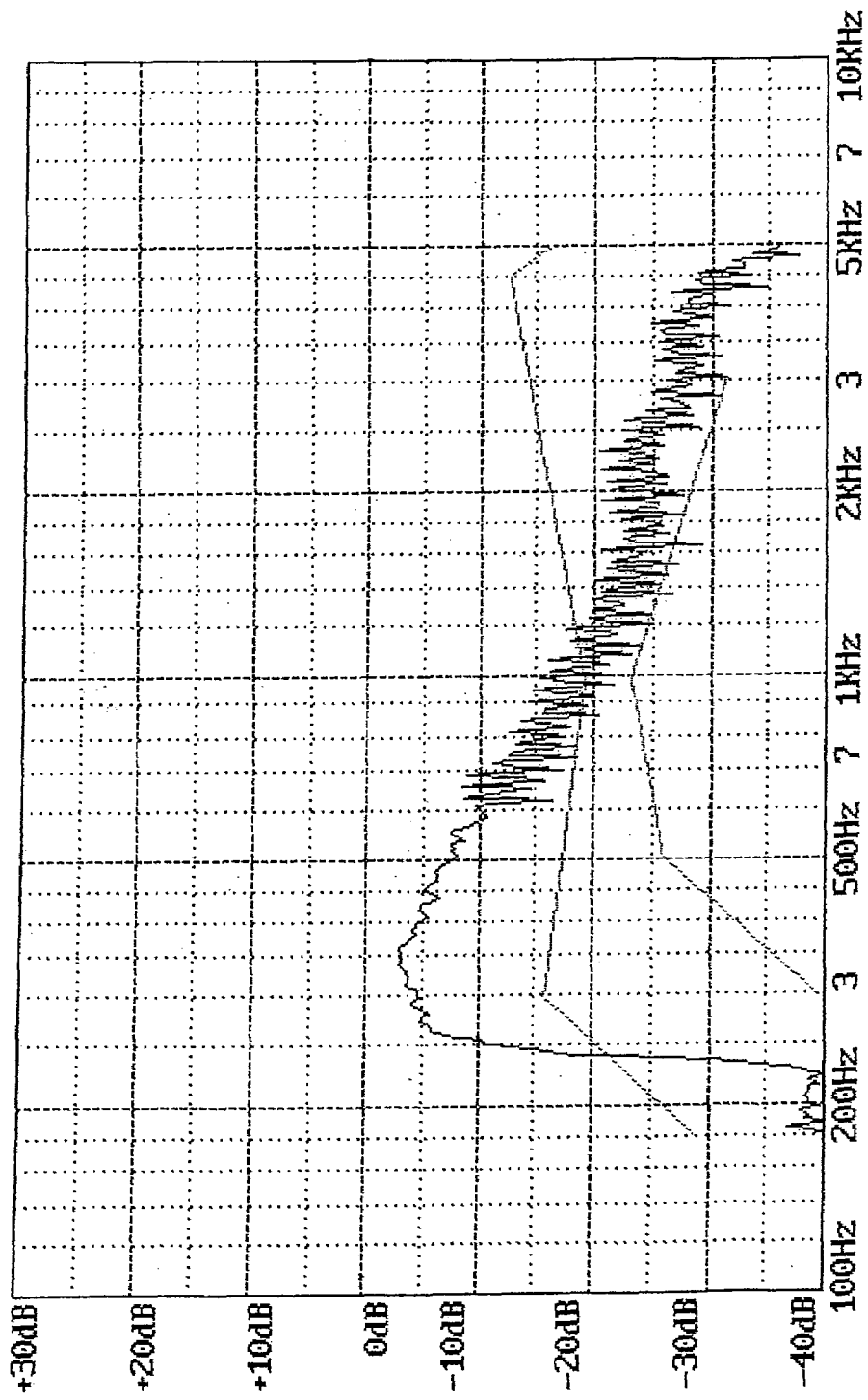
FIG. 4 is a sound frequency signal diagram for a conventional general touching type of indirect conductive microphone put on the neck.

Referring to FIG. 2 to 4, FIG. 2 shows an experimental sound frequency signal diagram of a nasal bone conduction wireless communication transmitting system according to the present invention, FIG. 3 shows an experimental sound frequency signal diagram of a local call, and FIG. 4 shows an experimental sound frequency signal diagram of an general touching type of indirect conductive microphone put on the neck. The vertical axis of the sound frequency signal diagram is bandwidth, and the horizontal axis is frequency. In the sound frequency signal diagram of FIG. 2, the bandwidth is from −20 dB to −30 dB at the frequency from 500 Hz to 1 kHz, the bandwidth is from −10 dB to −20 dB at the frequency from 1 kHz to 2 kHz, and the bandwidth is from −10 dB to −30 dB at the frequency from 2 kHz to 5 kHz. In the sound frequency signal diagram of FIG. 3, the bandwidth is from −10 dB to −20 dB at the frequency from 500 Hz to 1 kHz, and the bandwidth is also from −10 dB to −20 dB at the frequency from 1 kHz to 5 kHz. In the sound frequency signal diagram of FIG. 4, the bandwidth is from −10 dB to −20 dB at the frequency from 500 Hz to 1 kHz, the bandwidth is from −20 dB to −30 dB at the frequency from 1 kHz to 2 kHz, and the bandwidth is decayed below −30 dB at the frequency from 2 kHz to 5 kHz. As described above, the audio frequency signal of the nasal bone conduction wireless communication transmitting system according to the present invention which generates sound by the bone conduction is closer to the audio frequency signal of a local call than the audio frequency signal of a conventional general touching type of indirect conduction put on the neck, and a better sound quality can be obtained.

Figure 5:
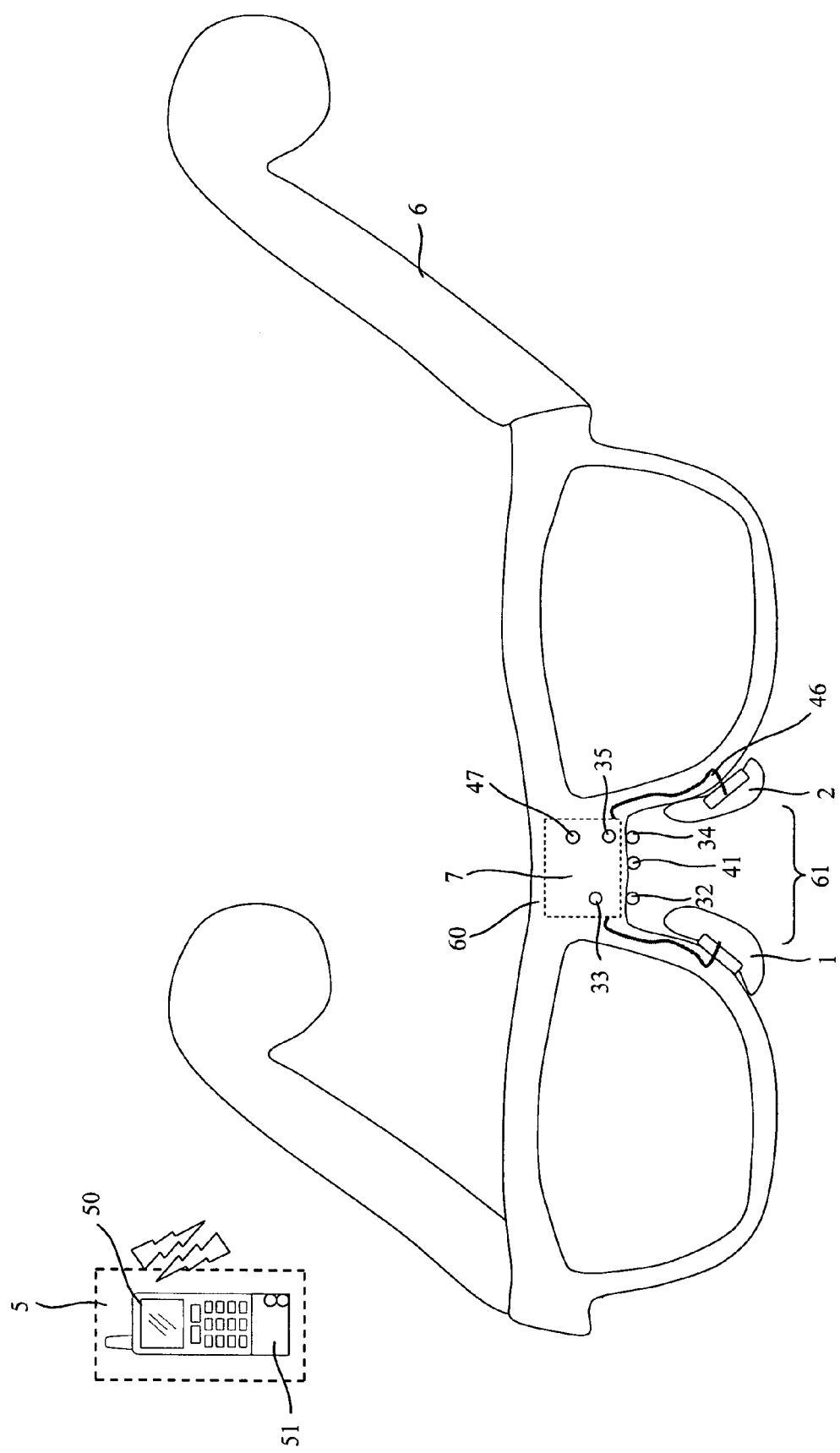
FIG. 5 is an application diagram of a nasal bone conduction wireless communication transmitting device embedded into a carrier, such as glasses, according to the present invention.

Referring to FIG. 5 in conjunction with FIG. 1, a 3D diagram of a nasal bone conduction wireless communication transmitting device embedded into a carrier, such as glasses, according to the present invention is shown. The nasal bone conduction wireless communication transmitting device 100 applied to glasses according to the present invention comprises: a pair of glasses 6, comprising a frame bridge 60 and a pair of pad holders 61; an embedded main housing 7 embedded in the pair of glasses 6, the wireless communication transmitting device 3 is provided in the embedded main housing 7, and the power switch 47, the function selector 35, the audio source switch 34, the frequency matching module 41, the volume tuner 32, and the talker 33 are provided on the panel of the main housing corresponding to the function selection of the wireless communication transmitting device 3; and a transmitting device 5, which comprises a wireless communicator 50 such as a mobile phone, and an external signal transceiver 51.

Continuing referring to FIG. 5, the pair of pad holders 61 provides a bone conduction outputting device 1 in one of the pair of pad holders 61 and provides a bone conduction inputting device 2 in another one. The bone conduction outputting device 1 and the bone conduction inputting device 2 in the pair of pad holders 61 will communicate with each other via a signal transmitting line 46 and the wireless communication transmitting device 3 provided in the embedded main housing 7. The mobile phone of the transmitting device 5 will connect the wireless communication transmitting device 3 provided in the embedded main housing 7 via the wireless connection by connecting with the signal transceiver 51. Thus the nasal bone conduction wireless communication transmitting device 100 according to the present invention is obtained.

Figure 6:
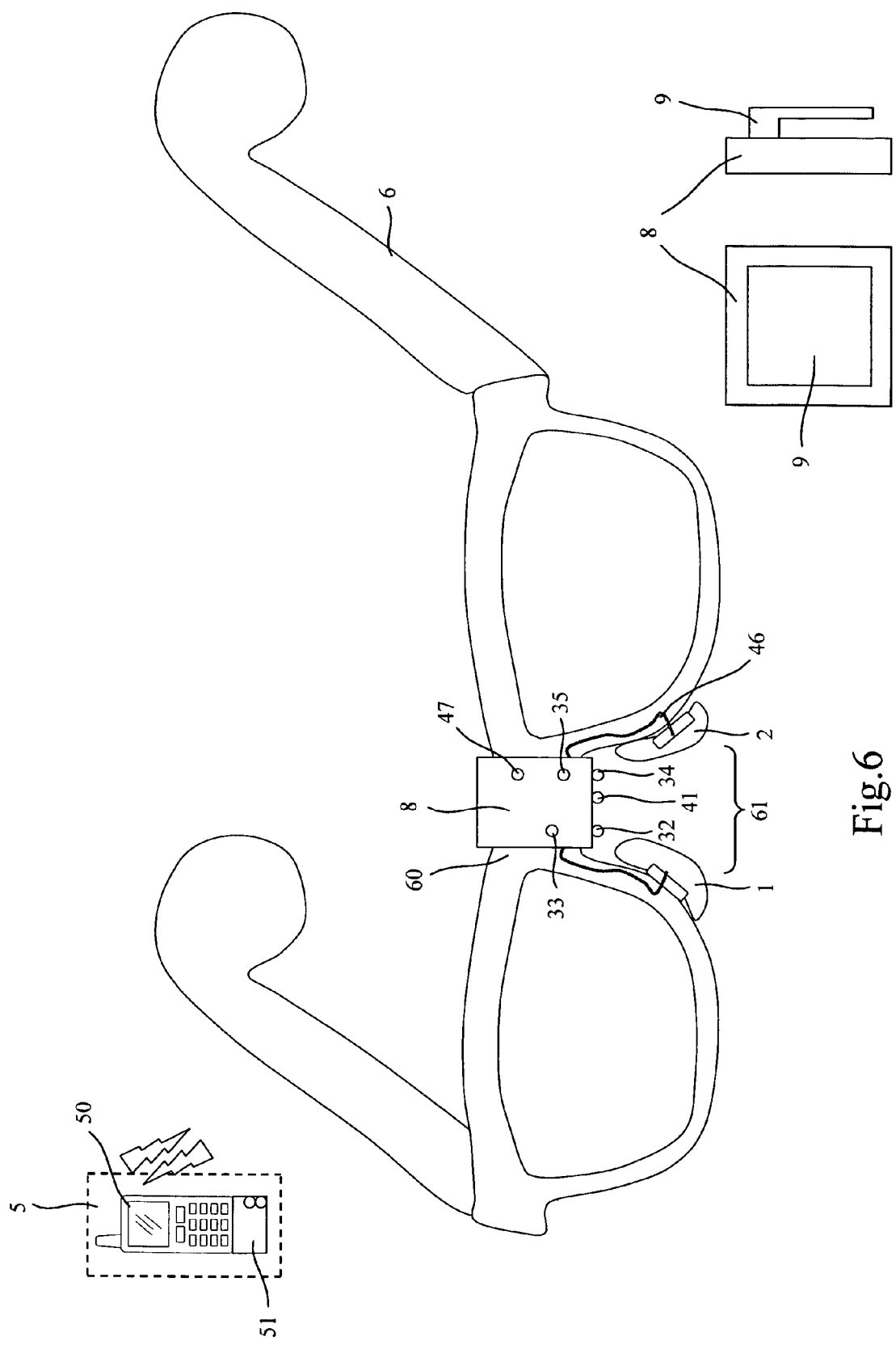
FIG. 6 is an application diagram of a nasal bone conduction wireless communication transmitting device which is movably sticked/attached to a carrier, such as glasses, according to the present invention.

Referring to FIG. 6, a 3D diagram of a nasal bone conduction wireless communication transmitting device which is movably sticked/attached to a carrier, such as glasses, according to the present invention is shown. The nasal bone conduction wireless communication transmitting device 100 applied to glasses according to the present invention comprises: a pair of glasses 6, comprising a frame bridge 60 and a pair of pad holders 61; a movable main housing 8, a sticking/attaching device 9 is provided on its back side for attaching to the frame bridge 60, the wireless communication transmitting device 3 is provided in the movable main housing 8, and the power switch 47, the function selector 35, the audio source switch 34, the frequency matching module 41, the volume tuner 32, and the talker 33 are provided on the panel of the main housing corresponding to the function selection of the wireless communication transmitting device 3; and a transmitting device 5, which comprises a wireless communicator 50 such as a mobile phone, and an external signal transceiver 51.

Continuing referring to FIG. 6, the pair of pad holders 61 provides a bone conduction outputting device 1 in one of the pair of pad holders 61 and provides a bone conduction inputting device 2 in another one. The bone conduction outputting device 1 and the bone conduction inputting device 2 in the pair of pad holders 61 will communicate with each other via a signal transmitting line 46 and the wireless communication transmitting device 3 provided in the movable main housing 8. The mobile phone of the transmitting device 5 will connect the wireless communication transmitting device 3 provided in the movable main housing 8 via the wireless connection by connecting with the signal transceiver 51. Thus the nasal bone conduction wireless communication transmitting device 100 according to the present invention is obtained.

Figure 7:
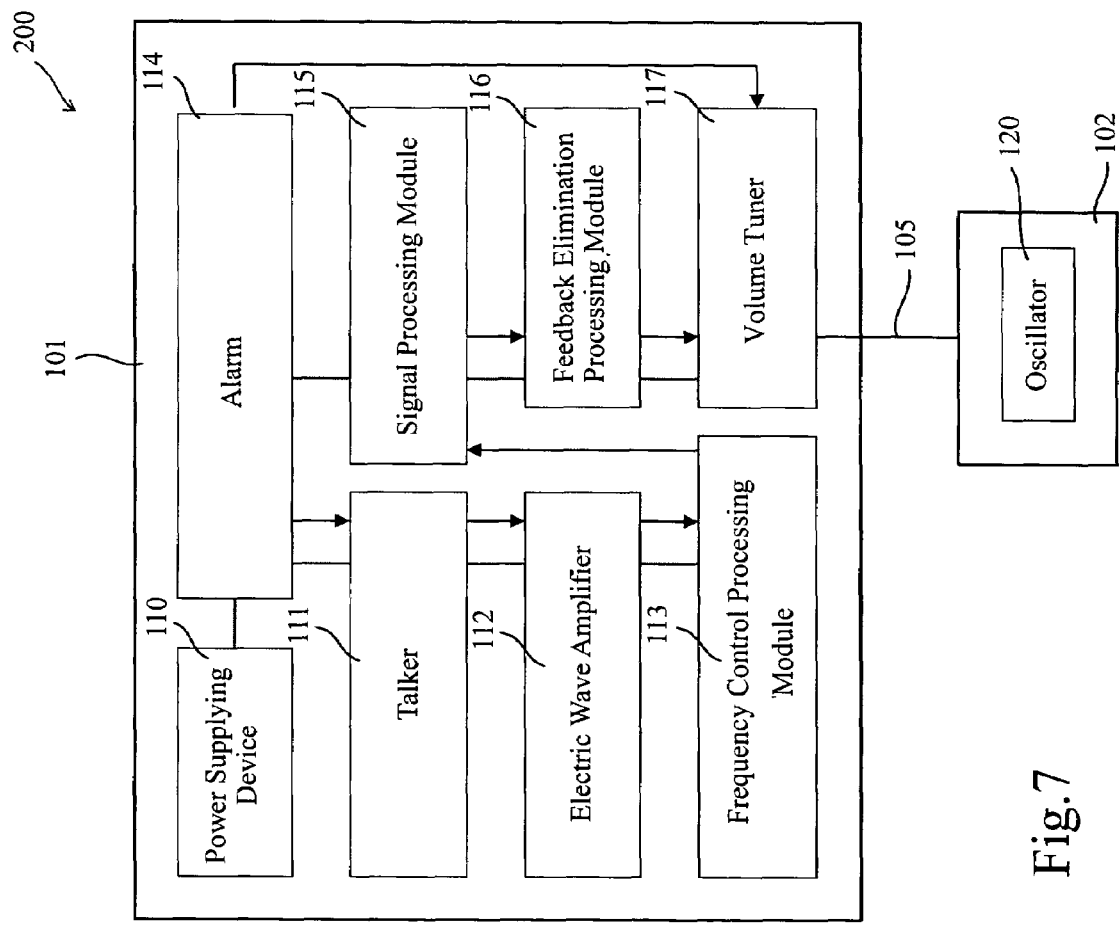
FIG. 7 is a block diagram of a nasal bone conduction hearing aid according to the present invention.

Referring to FIG. 7, a block diagram of the nasal bone conduction hearing aid according to the present invention is shown. The nasal bone conduction hearing aid 200 according to the present invention comprises: an adjusting device 101, which adjusting device comprises a power supplying device 110, a talker 111, an electric wave amplifier 112, a frequency control processing module 113, an alarm 114, a signal processing module 115, a feedback elimination processing module 116, a volume tuner 117, and a signal transmitting line 105; a bone skin conduction oscillating device 102 having an oscillator; and a carrier device(see FIG. 8 and 9), which carrier device will support the adjusting device 101 and the bone skin conduction oscillating device 102 and is put on the nose.

Continuing referring FIG. 7, the bone skin conduction oscillating device 102 will closely touch the skin of the nasal bone of the user. The oscillator 120 of the bone skin conduction oscillating device 102 will convert the received electric wave into an oscillating wave and send it to the ear via the skin of the nasal bone in order to have the function of receiving and hearing. The adjusting device 101 will receive and process the sound signal sent from the external environment, and the power supplying device 110 of the adjusting device 101 will supply all power needed by the nasal bone conduction hearing aid 200 according to the present invention. The power supplying device may be a battery or a related product that can supply power. The talker 111 may be a microphone for collecting the sound, and the electric wave amplifier 112 is used for enhancing the signal strength of the sound collected by the talker 111. The frequency control processing module 113 is used for selecting the signal frequencies of the talker 111 and the electric wave amplifier 112. The alarm 114 will automatically issue an alarm signal to prompt the user to change the battery when the power reaches a low supply level. The signal processing module 115 is used for reprocessing the signal after selecting frequency, and outputting a sound that more meet the hearing requirement of the user. The feedback elimination processing module 116 is used for automatically generating a set of reverse electronic signals to cancel out the feedback noise generated in the electronic signal of the signal processing module 115 in order to reduce the feedback sound of the nasal bone conduction hearing aid 200, thereby achieving the purpose of feedback elimination and reducing the interference to maintain the stability of the sound quality. And the volume tuner 117 is used for tuning the volume size.

In the operation of the nasal bone conduction hearing aid 200 according to the present invention, the power supplying device 110 will supply all power needed by the nasal bone conduction hearing aid 200. The alarm 114 will detect whether the power has reached the low supply level, if yes, an alarm signal will be sent to the bone skin conduction oscillating device 102 directly through the volume tuner 117 to make the user hear the alarm signal and then make a timely change of a new battery; if otherwise no, the talker 111 will collect the sound, the electric wave amplifier 112 will enhance the signal strength of the sound collected by the talker 111, and the frequency control processing module 113 will perform the processing of frequency selection to obtain the best environment for the frequency. And the signal processing module 115 will process the signal to make the sound quality from the external environment more suitable to the user. If a feedback sound was generated during the use process, the feedback elimination processing module 116 will then automatically generate a set of reverse electronic signals to cancel out the feedback noise in order to reduce the feedback sound of the nasal bone conduction hearing aid 200, thereby the noise due to the feedback will be eliminated. Then the sound signal will be tuned to the volume size suitable to the user by the volume tuner 117, and ultimately sent to the bone skin conduction device 2 via the signal transmitting line 105. Finally, the oscillator 120 of the bone skin conduction oscillating device 102 will convert the electric wave into an oscillating wave and send it to the ear via the skin of the nasal bone skin conduction. Consequently, the present invention is characterized by that the performance of hearing aid via the nasal bone conduction is better than that of the prior art.

Figure 8:
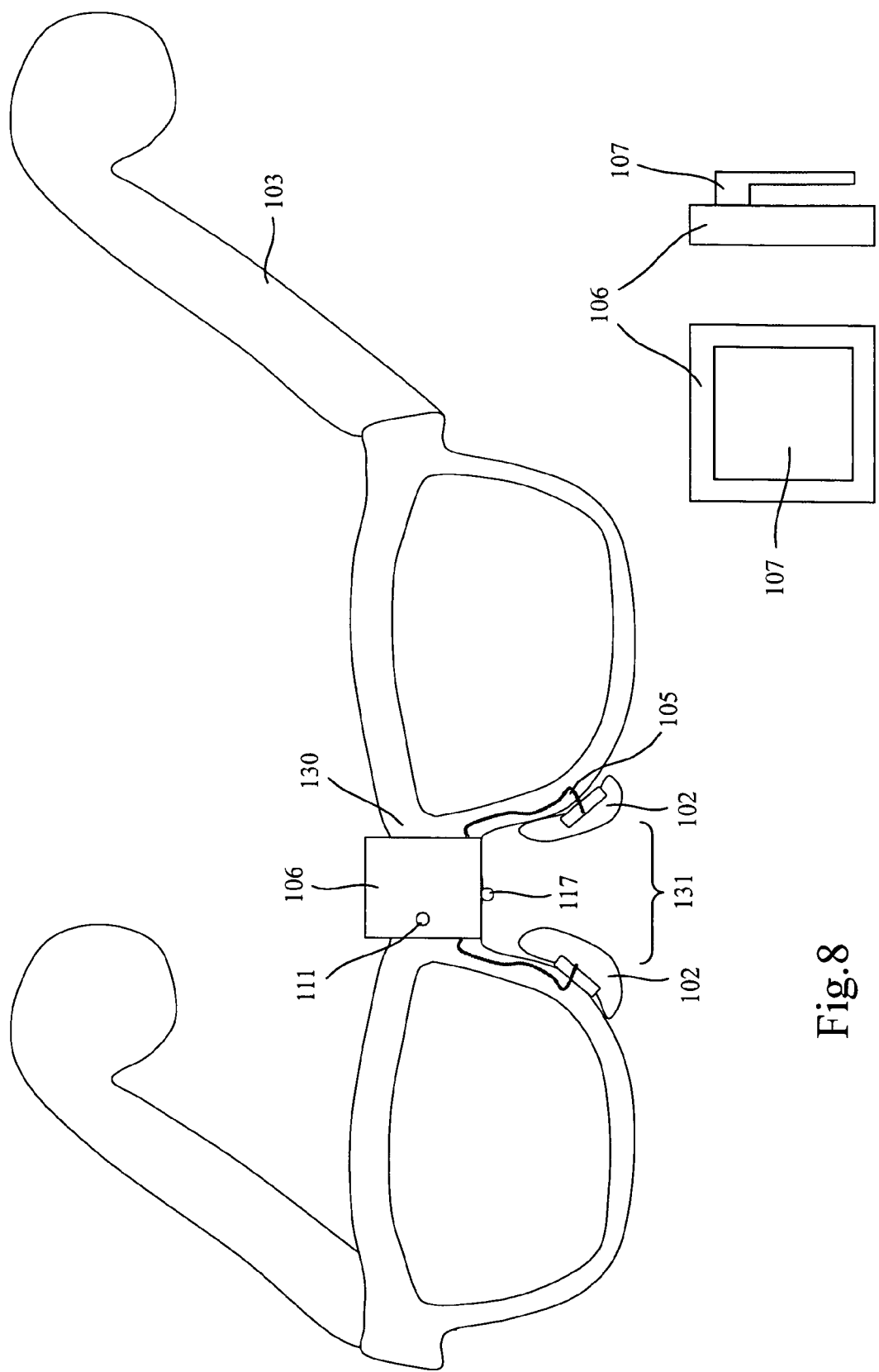
FIG. 8 is a 3D diagram of a nasal bone conduction hearing aid which is movably sticked/attached to a carrier, such as glasses, according to the present invention.

Referring to FIG. 8 in conjunction with FIG. 7, a 3D diagram of a nasal bone conduction hearing aid which is movably sticked/attached to a carrier, such as glasses, according to the present invention is shown. The nasal bone conduction hearing aid 200 applied to glasses according to the present invention comprises: a pair of glasses 103, comprising a frame bridge 130 and a pair of pad holders 131; a movable main housing 106, a sticking/attaching device 107 is provided on its back side for attaching to the frame bridge 130, the adjusting device 101 is provided in the movable main housing 106, and the talker 111 and the volume tuner 117 are provided on the panel of the movable main housing 106 corresponding to the function selection of the adjusting device 101.

The bone skin conduction oscillating device 102 is provided in the pair of pad holders 131, and the bone skin conduction oscillating device 102 of the pair of pad holders 131 will communicate with the adjusting device 101 of the movable main housing 106 via the signal transmitting line 5. In this way, in use, the talker 111 of the movable main housing 106 will receive the sound signal, the electric wave amplifier 112 of the adjusting device 101 will enhance the signal strength of the talker 111, and the frequency control processing module 113 will perform the processing of frequency selection. And then the signal processing module 115 will process the signal. The feedback elimination processing module 116 will reduce or eliminate the feedback sound of the nasal bone conduction hearing aid 200. Then the volume tuner 117 will tune the volume size, and ultimately the signal will be sent to the bone skin conduction device 102 in the pair of pad holders 131 via the signal transmitting line 5. Finally, the oscillator 120 of the bone skin conduction oscillating device 102 will convert the electric wave into an oscillating wave and send it to the ear for receiving and hearing via the skin of the nasal bone skin conduction. Consequently, the nasal bone conduction hearing aid 200 applied to glasses 103 according to the present invention is achieved.

Referring to FIG. 9 in conjunction with FIG. 7, a 3D diagram of a nasal bone conduction hearing aid embedded into a carrier, such as glasses, according to the present invention is shown. The nasal bone conduction hearing aid 200 applied to glasses according to the present invention comprises: a pair of glasses 103, comprising a frame bridge 130 and a pair of pad holders 131; an embedded main housing 104 embedded into the glasses 103, the adjusting device 101 is provided in the embedded main housing 104, and the talker 111 and the volume tuner 117 are provided on the panel of the embedded main housing 104 corresponding to the function selection of the adjusting device 101.

Continuing referring to FIG. 9, the bone skin conduction oscillating device 102 is provided in the pair of pad holders 131, and the bone skin conduction oscillating device 102 of the pair of pad holders 131 will communicate with the adjusting device 101 of the embedded main housing 104 via the signal transmitting line 105. In this way, in use, the talker 111 of the main housing 104 will receive the external sound signal, the electric wave amplifier 112 of the adjusting device 101 will enhance the signal strength of the talker 111, and the frequency control processing module 113 will perform the processing of frequency selection. And then the signal processing module 115 will process the signal. The feedback elimination processing module 116 will reduce or eliminate the feedback sound of the nasal bone conduction hearing aid 200. Then the volume tuner 117 will tune the volume size, and ultimately the signal will be sent to the bone skin conduction device 102 in the pair of pad holders 131 via the signal transmitting line 105. Finally, the oscillator 120 of the bone skin conduction oscillating device 102 will convert the electric wave into an oscillating wave and send it to the ear via the skin of the nasal bone skin conduction. Consequently, the nasal bone conduction hearing aid 200 applied to glasses 103 according to the present invention is achieved.

Upon reading the detailed description of these preferred embodiments of the present invention, those skilled in the art will recognize that variations and modifications can be made without departing from the spirit and scope of the invention as claimed in the accompanying claims, and the present invention is not limited to the implementions of these embodiments in this specification.

The invention claimed is:

1. A nasal bone conduction wireless communication transmitting device, comprising:
   a bone conduction inputting device having a first vibrator, for converting the sound to be output into an electrical wave;
   a wireless communication transmitting device electrically connected to said bone conduction inputting device, for receiving the electrical wave signal and transmit the electrical wave signal out and/or receive an external electrical wave signal;
   a bone conduction outputting device having a second vibrator, for receiving the external electrical wave signal sent by said wireless communication, converting the electrical wave signal into an vibrating wave, and making the vibrating wave transmitted into the ear via nasal bone conduction; and
   a carrier device for supporting said bone conduction inputting device, said wireless communication transmitting device, and said bone conduction outputting;
   characterized by,
   said carrier device is a carrier provided on the nose for making said bone conduction outputting device and said bone conduction inputting device touching the skin of the nasal bone, making the vibrating wave of said bone conduction outputting device being passed to the ear via the nasal bone conduction after the resonance in the nasal cavity, and picking up the sound provided through the resonance in the nasal cavity by said bone conduction inputting device, and then transmitting said electrical wave to said wireless communication transmitting device for signaling.

2. The nasal bone conduction wireless communication transmitting device of claim 1, wherein said wireless communication transmitting device receives or transmits a wireless signal based on Bluetooth wireless communication protocol or microwave or infrared ray or RF or RFID sensors.

3. The nasal bone conduction wireless communication transmitting device of claim 1, wherein said wireless communication transmitting device comprises at least: an antenna, a signal transceiving unit, and a signal processing unit.

4. The nasal bone conduction wireless communication transmitting device of claim 1, wherein said wireless communication transmitting device comprises at least: a function selector, an audio source switch, and a volume tuner.

5. The nasal bone conduction wireless communication transmitting device of claim 1, wherein said wireless communication transmitting device will wirelessly link a wireless adjuster.

6. The nasal bone conduction wireless communication transmitting device of claim 1, wherein said wireless communication transmitting device further provides a talker, said talker is used for collecting the sound and transmitting the collected signal to said bone skin conduction outputting device, thereby making said nasal bone conduction wireless communication transmitting device have the function of a hearing aid.

7. A nasal bone conduction wireless communication transmitting device, comprising:
   a bone conduction inputting device having an vibrator, for converting the sound to be output into an electrical wave;
   a wireless communication transmitting device electrically connected to said bone conduction inputting device, for receiving the electrical wave signal; and
   a carrier device for supporting said bone conduction inputting device and wireless communication transmitting;
   characterized by,
   said carrier device is a carrier provided on the nose for making said bone conduction inputting device touching the skin of the nasal bone, and picking up the sound provided through the resonance in the nasal cavity by said bone conduction inputting device, and then transmitting said electrical wave to said wireless communication transmitting device for signaling.

8. The nasal bone conduction wireless communication transmitting device of claim 7, wherein said carrier device is glasses, hydroscopes, goggles, eyeprotection glasses, nose masks, mouth masks, face masks, head masks, helmet, skidlid, patches or nose clips, that can make said nasal bone conduction wireless communication transmitting device attached on the skin of the nose.

9. The nasal bone conduction wireless communication transmitting device of claim 7, wherein said wireless communication transmitting device receives or transmits a wireless signal based on Bluetooth wireless communication protocol or microwave or infrared ray or RF or RFID sensors.

10. The nasal bone conduction wireless communication transmitting device of claim 7, wherein said wireless communication transmitting device comprises at least: an antenna, a signal transceiving unit, and a signal processing unit.

11. The nasal bone conduction wireless communication transmitting device of claim 7, wherein said wireless communication transmitting device comprises at least: a function selector, an audio source switch, and a volume tuner.

12. The nasal bone conduction wireless communication transmitting device of claim 7, wherein said wireless communication transmitting device will wirelessly link a wireless adjuster.

13. A nasal bone conduction wireless communication transmitting device, comprising:
   a wireless communication transmitting device, for receiving an electrical wave signal;
   a bone conduction outputting device having an vibrator, for receiving the external electrical wave signal sent by said wireless communication, converting the electrical wave signal into an vibrating wave, and making the vibrating wave transmitted into the ear via nasal bone conduction; and
   a carrier device for supporting said wireless communication transmitting device and said bone conduction outputting;
   characterized by,
   said carrier device is a carrier provided on the nose for making said bone conduction inputting device touching the skin of the nasal bone, and making the vibrating wave of said bone conduction outputting device being passed to the ear via the nasal bone conduction after the resonance in the nasal cavity.

14. The nasal bone conduction wireless communication transmitting device of claim 13, wherein said carrier device is glasses, hydroscopes, goggles, eyeprotection glasses, nose masks, mouth masks, face masks, head masks, helmet, skidlid, patches, or nose clips, that can make said nasal bone conduction wireless communication transmitting device attached on the skin of the nose.

15. The nasal bone conduction wireless communication transmitting device of claim 13, wherein said wireless communication transmitting device receives or transmits a wireless signal based on Bluetooth wireless communication protocol or microwave or infrared ray or RF or RFID sensors.

16. The nasal bone conduction wireless communication transmitting device of claim 13, wherein said wireless communication transmitting device comprises at least: an antenna, a signal transceiving unit, and a signal processing unit.

17. The nasal bone conduction wireless communication transmitting device of claim 13, wherein said wireless communication transmitting device comprises at least: a function selector, an audio source switch, and a volume tuner.

18. The nasal bone conduction wireless communication transmitting device of claim 13, wherein said wireless communication transmitting device will wirelessly link a wireless adjuster.

19. The nasal bone conduction wireless communication transmitting device of claim 13, wherein said wireless communication transmitting device further provides a talker, said talker is used for collecting the sound and transmitting the collected signal to said bone skin conduction outputting device, thereby making said nasal bone conduction wireless communication transmitting device have the function of a hearing aid.

20. A nasal bone conduction wireless communication system, comprising:
   a transmitting device; and
   a nasal bone conduction wireless communication transmitting device which wirelessly connects said transmitting device, comprising:
   a bone conduction inputting device having a first vibrator, for converting the sound to be output into an electrical wave;
   a wireless communication transmitting device electrically connected to said bone conduction inputting device, for receiving the electrical wave signal and transmit the electrical wave signal out and/or receive an external electrical wave signal;
   a bone conduction outputting device having a second vibrator, for receiving the external electrical wave signal sent by the wireless communication, converting the electrical wave signal into an vibrating wave, and making the vibrating wave transmitted into the ear via nasal bone conduction; and
   a carrier device for supporting said bone conduction inputting device, said wireless communication transmitting device, and said bone conduction outputting device;
   characterized by,
   said carrier device is a carrier provided on the nose for making said bone conduction outputting device and said bone conduction inputting device touching the skin of the nasal bone, making the vibrating wave of said bone conduction outputting device being passed to the ear via the nasal bone conduction after the resonance in the nasal cavity, and picking up the sound provided through the resonance in the nasal cavity by said bone conduction inputting device, and then transmitting the electrical wave to said wireless communication transmitting device for signaling.

21. The nasal bone conduction wireless communication transmitting system of claim 20, wherein the carrier device is glasses, hydroscopes, goggles, eyeprotection glasses, nose masks, mouth masks, face masks, head masks, helmet, skidlid, patches, or nose clips, that can make said nasal bone conduction wireless communication transmitting device attached on the skin of the nose.

22. The nasal bone conduction wireless communication transmitting system of claim 20, wherein said wireless communication transmitting device will establish wireless connection with said transmitting device.

23. The nasal bone conduction wireless communication transmitting system of claim 20, wherein said transmitting device is a wireless communication product having the function of linking, transmitting, and frequency matching.

24. The nasal bone conduction wireless communication transmitting system of claim 20, wherein said transmitting device is formed by a wireless communicator interfacing with a signal transceiver.

25. The nasal bone conduction wireless communication transmitting system of claim 24, wherein said wireless communicator is a mobile phone, or a PDA.

26. The nasal bone conduction wireless communication transmitting system of claim 24, wherein said wireless communicator is further a wireless transmitter utilizing infrared, RF(radio frequency), or microwave.

27. The nasal bone conduction wireless communication transmitting system of claim 24, wherein said wireless communicator and said signal transceiver are electrically connected via a connector, and said connector may be designed in the form of an earphone jack, a PCMCIA card, or an USB port.

28. The nasal bone conduction wireless communication transmitting system of claim 24, wherein said signal transceiver works with the connection of an audio product such as a MP3 player, a walkman, a computer, a recorder, a hi-fi equipment or a television, thereby combining said wireless communication transmitting device with said bone conduction inputting device to provide the function of an earphone being able to transmitting and receiving.

29. The nasal bone conduction wireless communication transmitting system of claim 20, wherein said wireless communication transmitting device comprises at least: an antenna, a signal transceiving unit, and a signal processing unit.

30. The nasal bone conduction wireless communication transmitting system of claim 20, wherein said wireless communication transmitting device comprises at least: a function selector, an audio source switch, and a volume tuner.

31. The nasal bone conduction wireless communication transmitting system of claim 20, wherein said wireless communication transmitting device will wirelessly link a wireless adjuster.

32. The nasal bone conduction wireless communication transmitting system of claim 20, wherein said wireless communication transmitting device further provides a talker, said talker is used for collecting the sound and transmitting the collected signal to said bone skin conduction outputting device, thereby making said nasal bone conduction wireless communication transmitting device have the function of a hearing aid.

33. The nasal bone conduction wireless communication transmitting system of claim 20, wherein said wireless communication transmitting device receives or transmits a wireless signal based on Bluetooth wireless communication protocol or microwave or infrared ray or RF or RFID sensors.

34. A nasal bone conduction hearing aid, comprising:
an adjusting device, for receiving and process the sound signal sent from the external environment;
a bone skin conduction vibrating device having an vibrator, for receiving the signal processed by said adjusting device; and
a carrier device for supporting said adjusting device and said bone skin conduction vibrating device;
characterized by,
said carrier device is a carrier provided on the nose for making said bone skin conduction vibrating device touching the skin of the nasal bone, and
said vibrator is used for converting the electrical wave received by said bone
skin conduction vibrating device into an vibrating wave and transmitting the vibrating wave to the nose, thereby making the vibrating wave being passed to the ear via the nasal bone skin conduction.

35. The nasal bone conduction hearing aid of claim 34, wherein said adjusting device comprises a talker, an electrical wave amplifier, a frequency control processing module, a signal processing module, a feedback elimination processing module, a power supplying device, and a signal transmitting line.

* * * * *